(12) United States Patent
Scheffer

(10) Patent No.: US 10,294,036 B2
(45) Date of Patent: May 21, 2019

(54) HORIZONTAL MOTORIZED DYNAMIC SYSTEM FOR PALLET-CARRIER RACKS

(71) Applicant: AGUIA SISTEMAS DE ARMAZENAGEM S.A., Paraná (BR)

(72) Inventor: Rogerio Scheffer, Paraná (BR)

(73) Assignee: AGUIA SISTEMAS DE ARMAZENAGEM S.A., Paraná (BR)

( * ) Notice: Subject to any disclaimer, the term of this patent is extended or adjusted under 35 U.S.C. 154(b) by 0 days.

(21) Appl. No.: 15/559,720

(22) PCT Filed: Feb. 17, 2016

(86) PCT No.: PCT/BR2016/050033
§ 371 (c)(1),
(2) Date: Sep. 19, 2017

(87) PCT Pub. No.: WO2016/145500
PCT Pub. Date: Sep. 22, 2016

(65) Prior Publication Data
US 2018/0093834 A1  Apr. 5, 2018

(30) Foreign Application Priority Data
Mar. 19, 2015 (BR) .......................... 1020150060742

(51) Int. Cl.
*B65G 39/18* (2006.01)
*B65G 13/06* (2006.01)
*B65G 23/08* (2006.01)
*B65G 1/02* (2006.01)

(52) U.S. Cl.
CPC ............. *B65G 39/18* (2013.01); *B65G 1/023* (2013.01); *B65G 13/06* (2013.01); *B65G 23/08* (2013.01)

(58) Field of Classification Search
CPC ....................................... B65G 23/08
USPC ....................................... 198/788
See application file for complete search history.

(56) References Cited

U.S. PATENT DOCUMENTS

| | | | |
|---|---|---|---|
| 5,509,253 A * | 4/1996 | Cappi | .................... B65B 59/00 53/389.2 |
| 2012/0160637 A1* | 6/2012 | Itoh | ........................ B65G 1/023 198/784 |

* cited by examiner

*Primary Examiner* — Gene O Crawford
*Assistant Examiner* — Lester Rushin, III
(74) *Attorney, Agent, or Firm* — B. Aaron Schulman, Esq.; Stites & Harbison, PLLC

(57) ABSTRACT

A horizontal motorized dynamic system for pallet-carrier racks, which allows the formation of a motorized dynamic system as a specific, stand-alone electromechanical structure based on a horizontal conveyor track with motorized pulleys or motorized conveyor rollers controlled by electronic boards for each pallet position. The system is intended for dynamic pallet level racking on selective pallet-carrier racks in order to provide, in an extremely practical, safe and economical manner, complete optimization and excellent performance in the manufacturing, assembly and operating procedures of pallet-carrier racks. This is combined with extraordinary structural performance and high level economy of materials and space, and is based on a motorized dynamic system of high strength, safety and versatility.

5 Claims, 13 Drawing Sheets

HORIZONTAL MOTORIZED DYNAMIC SYSTEM FOR PALLET-CARRIER RACKS

The present patent of invention refers to logistics systems in general, more specifically to a horizontal motorized dynamic system for pallet-carrier racks which, according to the general features thereof, allows the formation of a motorized dynamic system as a specific, stand-alone structure of electromechanical type, based on a horizontal conveyor track provided with motorized-driven pulleys or motorized conveyor rollers controlled by electronic boards for each pallet position and intended for dynamic pallet level racking on selective pallet-carrier racks in general, in order to provide, in an extremely practical, safe and economical manner, complete optimization and excellent performance in the manufacturing, assembly and operating procedures of pallet-carrier racks, combined with extraordinary structural performance with a high-level economy of materials and space and being based on a motorized dynamic system of high strength, safety and versatility. With a specific design and format and easy access for better adaptation and user safety, convenience features in handling and functionality, very affordable and, due to its general characteristics and dimensions, easily adaptable to a variety of racking systems, pallets, goods, forklifts, users and locations in general, regardless of the characteristics that they may present.

Dynamic systems employed in pallet-carrier racks and widely known in the state of the art are based on gravity—dynamic gravity systems, that is, a variety of gently sloped conveyor tracks with a degree of approximately four percent in relation to the horizontal position to allow the pallet placed by a forklift at the inlet end to move over the entire length of the track up to its storage position or withdrawal from the rack simply via the gravity generated by the slope on the track and its sliding over the several types of rollers.

More recently, some conveyor tracks provided in pallet-carrier racks now incorporate dynamic mechanized systems based on motorized rollers symmetrically spaced apart on the conveyor track, i.e., rollers have a built-in motor on the inside which enable them to rotate and hence rotate all other non-motorized rollers disposed along the conveyor track. It should be noted that the motorized rollers are interconnected and directly controlled by a PLC—Programmable Logic Controller—and driven by sensors arranged adjacent to the conveyor track; power transmission of the few motorized rollers to the other non-motorized rollers making up the conveyor track being performed exclusively by means of a power transmission system, i.e., a set of belts symmetrically arranged between the side bearings or grooves located on the side edges of two consecutive rollers along the entire length of the conveyor track.

However, although these systems are widely used throughout pallet-carrier racks, they have a series of limitations or inconveniences in their preparation, structuring and operation, including: a marked limitation on the length and height of the pallet-carrier racks, space is lost and one or more storage levels are easily wasted due to the slope on the conveyor tracks in proportion to the depth of the tunnel; reliability and accuracy are harmed when moving pallets over the conveyor track rollers as this movement is based on gravity which is influenced by factors such as humidity, pallet quality, load variation on the pallet; considerable risk of inaccuracy in the arrival of pallets at the end of the conveyor track due to the use of gravity as the pallet handling element, and possibly having pallets stopped through the tunnels due to the subtlety of gravity action force; and the obligatory presence of sensors as the assembly control system and a transmission system between motorized or non-motorized rollers using belts, which makes more complex the operation of the dynamic system as a whole.

Specifically in dynamic mechanized systems, these are almost economically unfeasible due to their high cost, besides being impossible to control pallets individually, so when a pallet is already in the rack, you cannot move another one individually, unless a complex system of individual motors and respective controls and commands is available.

In this line of action, it has become essential for companies that design, assemble and operate selective pallet-carrier racks in general the elaboration of a versatile, practical, safe and economical structure capable of eliminating this drawback and especially the currently existing obstacles in the preparation of selective pallet-carrier racks as, for example, increasing the pallet capacity in the racks and the accuracy of pallet arrival at the end of the conveyor tracks.

In an extensive review of the literature in order to provide the current state of the art of selective pallet-carrier racks for pallet level racking, object of the present patent of invention, relevant documents from the prior art related to the specific object claimed in the present invention were not described, namely, a horizontal motorized dynamic system for pallet-carrier racks with motorized pulleys or motorized conveyor rollers controlled by electronic boards for each pallet position.

Thus, the overall design of this present horizontal motorized dynamic system for pallet-carrier racks, object of the present invention, is entirely based on its simple and robust structure with a minimum required number of components and extremely simple, safe and optimized operation, combined with fairly practical manufacturing and maintenance procedures so as to generate an extremely practical and efficient motorized dynamic system that provides dynamic level pallet racking through a horizontally arranged conveyor track along the entire length of the pallet-carrier rack and containing motorized pulleys or motorized conveyor rollers symmetrically spaced apart by sets of traditional rollers along the entire length of the conveyor track and individually controlled by electronic boards for each pallet position along the conveyor track.

More specifically, motorized pulleys or motorized conveyor rollers are constantly driven from time to time directly by the electronic boards, each on a pallet position in the conveyor track and by its electronic board in order to perform a small rotation counterclockwise, thus identifying the presence of the pallet on its body by increasing the amperage. If the electronic board identifies a pallet on the motorized pulley or motorized conveyor roller by reading the amperage, the motorized pulley or motorized conveyor roller is driven by the electronic board to rotate clockwise the number of turns required to move the pallet from this position to the next position—from a motorized pulley or motorized conveyor roller to the next one.

This design of the horizontal dynamic system for pallet-carrier racks that allows the motorized pulley or motorized conveyor roller to rotate constantly from time to time by programming the electronic board enables the logic of the motorized dynamic system because the motorized pulley or motorized conveyor roller, by means of the electronic board, clearly distinguishes the moment there is a pallet on its structure by increasing the amperage and rotates clockwise so as to pull the pallet over the other traditional rollers. It also prevents pallets from getting too close to one another along the conveyor track or even at the end position of the conveyor track.

It should be noted that the major point of this design is the individualized controls of the motorized pulleys or motorized conveyor rollers, i.e., the boards and the counterclockwise rotation from time to time are controlled and instruct the motorized pulleys or motorized conveyor rollers whether to engage or not based on the amperage variance generated by the pallet weight on the motorized pulleys or motorized conveyor rollers.

The assembly comprised by the electronic board and the motorized pulley or motorized conveyor roller with these specific features can provide this capacity to the motorized dynamic system, whose characteristics were specifically developed to act as a proper pallet racking system, i.e., it can be used horizontally and can reach very large lengths thus greatly increasing racking density and enabling systems applied to pallet-carrier racks which are located in specific areas in the warehouse such as side walls and all the available height thereof associated to a simple pallet forklift to become a sophisticated, compact and extremely reliable and efficient system.

The present horizontal motorized dynamic system for pallet-carrier racks, unlike the widely known pallet-carrier racks, shows a change in the handling of pallets in its structure, i.e., pallets are placed vertically onto the conveyor track and handled first by the motorized pulley or motorized conveyor roller and then by the other traditional rollers until the next position of motorized pulley or motorized conveyor roller along the conveyor track and so on until the exit end thereof.

The patent in question is characterized by combining components and procedures in a differentiated design which meets the various requirements the nature of its use demands, i.e., dynamic pallet racking in pallet-carrier racks in general. That design ensures a motorized dynamic system of great efficiency, functionality, strength, durability, versatility, safety, accuracy, economy and ergonomics due to the excellent aggregated technical qualities, which provide advantages and improvements in the dynamic pallet racking procedures in selective pallet-carrier racks in general, and whose general characteristics differ from the other shapes and models known in the current state of the art.

The present patent of invention comprises the use of a modern, efficient, safe and functional horizontal motorized dynamic system for pallet-carrier racks formed by a set of properly incorporated logistical and mechanical solutions, forming a complete and differentiated motorized dynamic system with a unique design, great finish details and specific characteristics, which incorporates its own specific mechanical type structure of high durability and strength, general parallelepipedal shape and containing a properly integrated and symmetrically arranged central structure as a structuring element of the motorized dynamic system as a whole in a selective pallet-carrier rack; conveyor tracks as individualized structuring elements of the motorized dynamic system along the central structure; motorized pulleys or motorized conveyor rollers as support and handling elements for the pallets along the conveyor track; conveyor rollers as support and handling elements for the pallets along the conveyor tracks and between the motorized pulleys or motorized conveyor rollers; and electronic boards as control elements for the motorized pulleys or motorized conveyor rollers in order to make it possible to form a single, complete and safe assembly, whose shapes and internal and external arrangements enable seamless disposition to several different places and storage (support and handling) of all kinds of pallet/goods sets, and specially designed for that purpose with its own geometry.

The present motorized dynamic system is based on the application of components and processes in a differentiated concept without, however, achieving a high degree of sophistication and complexity, thus making it possible to solve some of the main drawbacks of other shapes and models of pallet-carrier racks widely known in the state of the art and employed in pallet racking operations in selective pallet-carrier racks in general, which are located in an operating range in which the limitations on use and application and the high cost of the material used are very common and the shapes and/or models are of rather high cost, low productivity in assembly, frequent accidents, general high volume and weight, high assembly time and low performance.

The objectives, advantages and other important characteristics of the patent in question can be more easily understood when read in conjunction with the accompanying drawings, in which.

Figure 1:
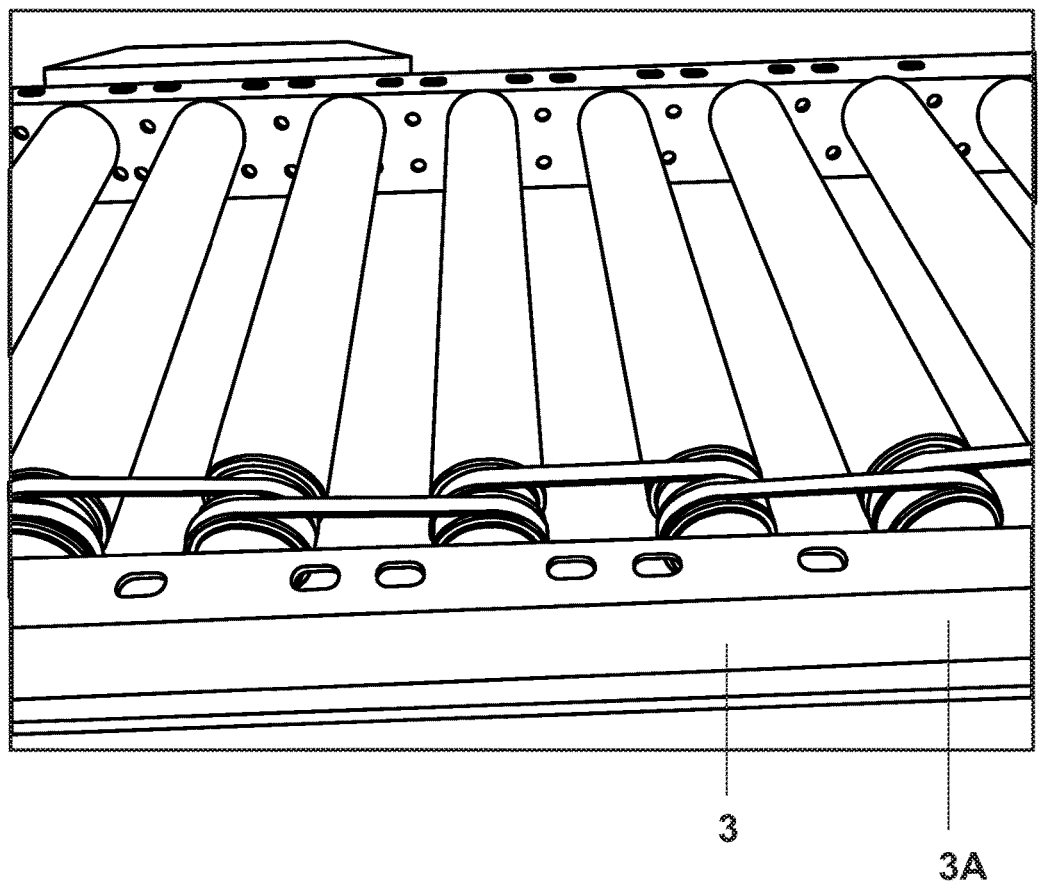
FIG. 1 is an exploded perspective view of a motorized dynamic system based on belts and known in the present state of the art.
Figure 2A:
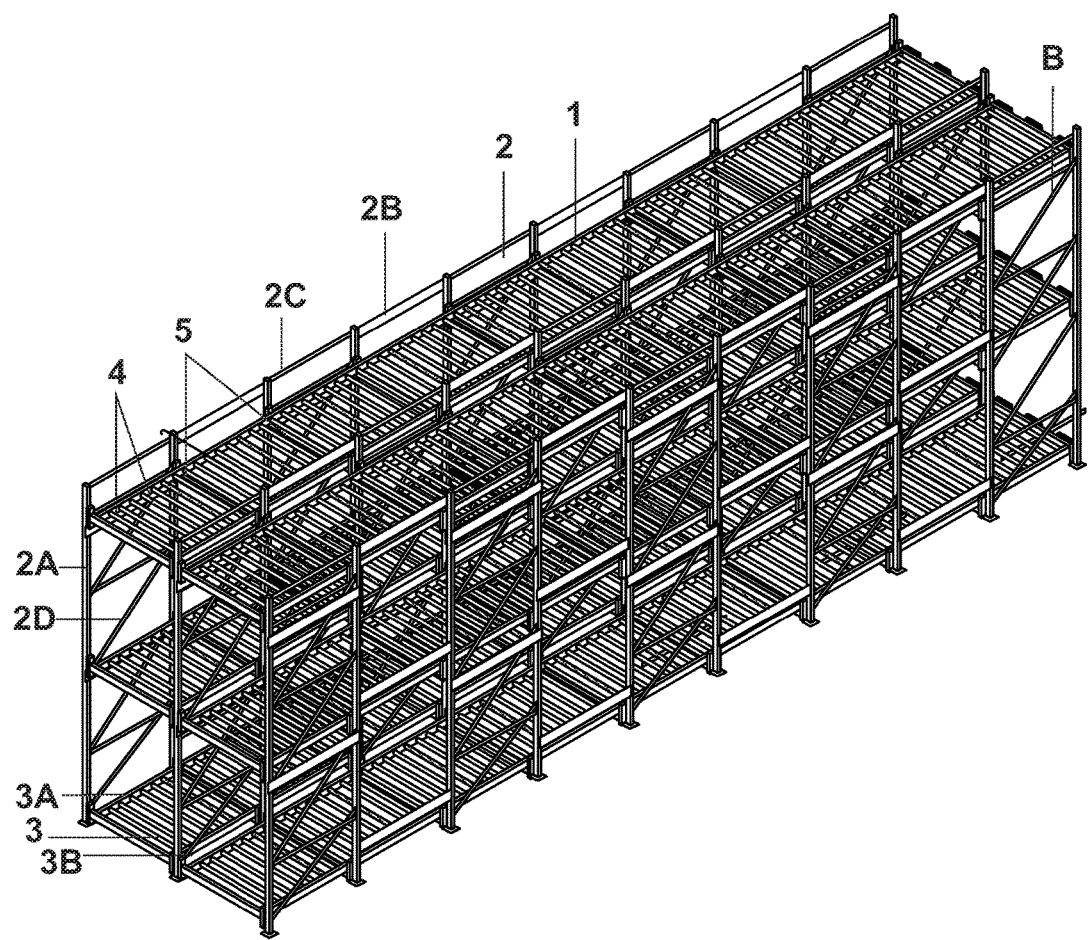
FIG. 2A is a perspective view of the horizontal motorized dynamic system for pallet-carrier racks.
Figure 2C:
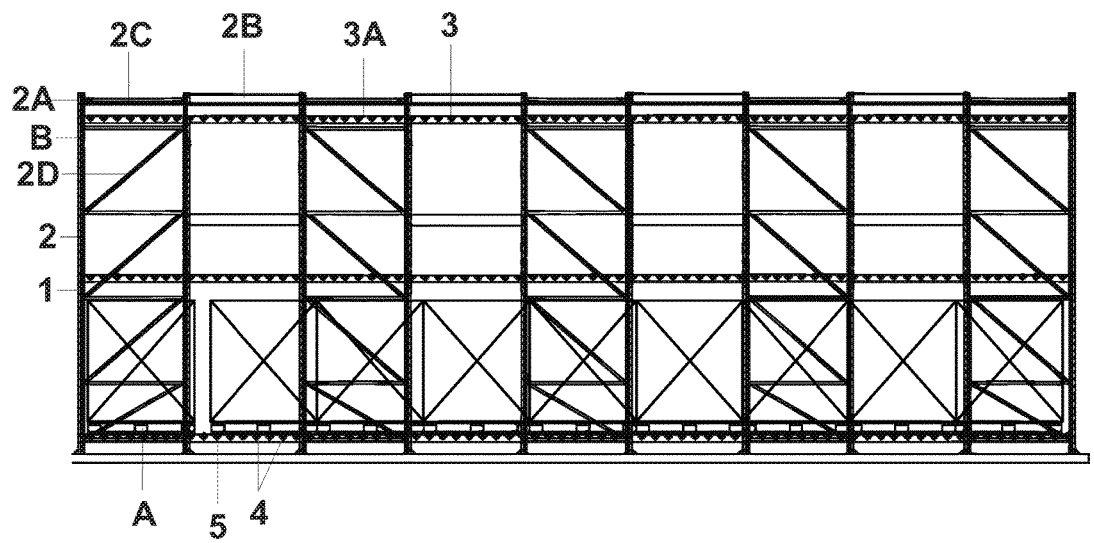
FIG. 2C is a side view of the horizontal motorized dynamic system for pallet-carrier racks.
Figure 2B:
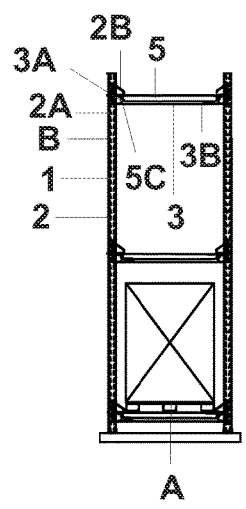
FIG. 2B is a front view of the horizontal motorized dynamic system for pallet-carrier racks.
Figure 2D:
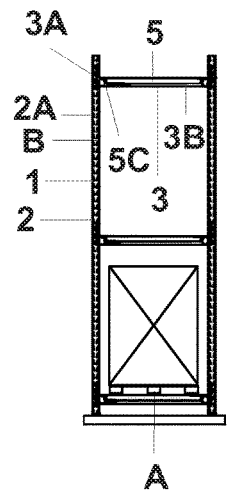
FIG. 2D is a rear view of the horizontal motorized dynamic system for pallet-carrier racks.
Figure 3A:
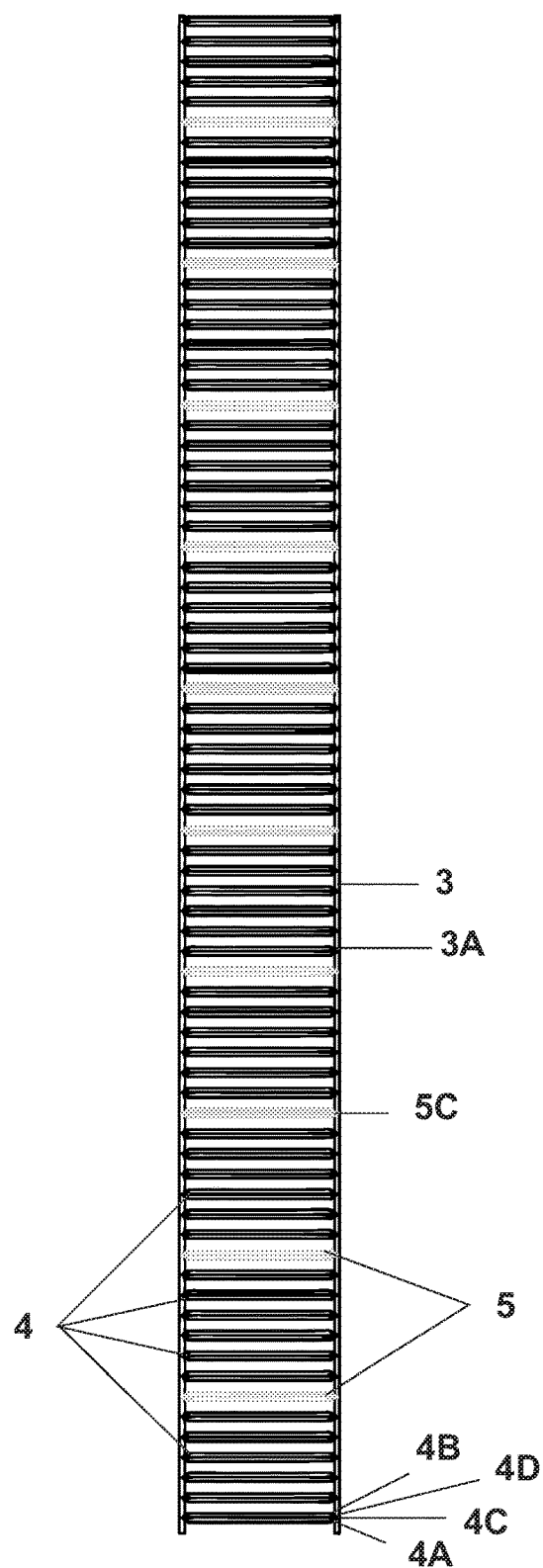
FIG. 3A is a top view of the conveyor track of the horizontal motorized dynamic system for pallet-carrier racks.
Figure 3B:
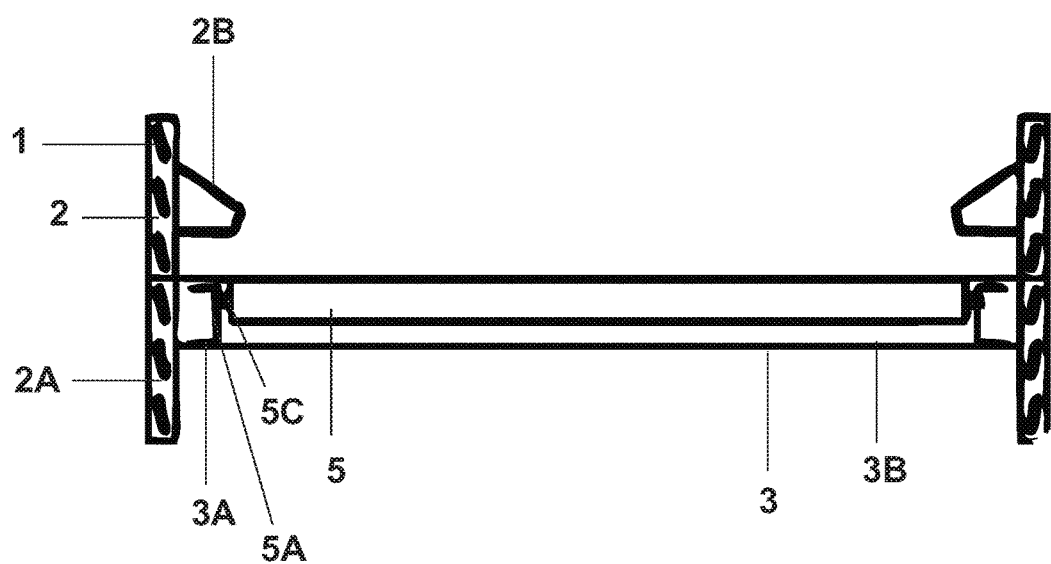
FIG. 3B is a front view of the conveyor track of the horizontal motorized dynamic system for pallet-carrier racks.
Figure 3C:
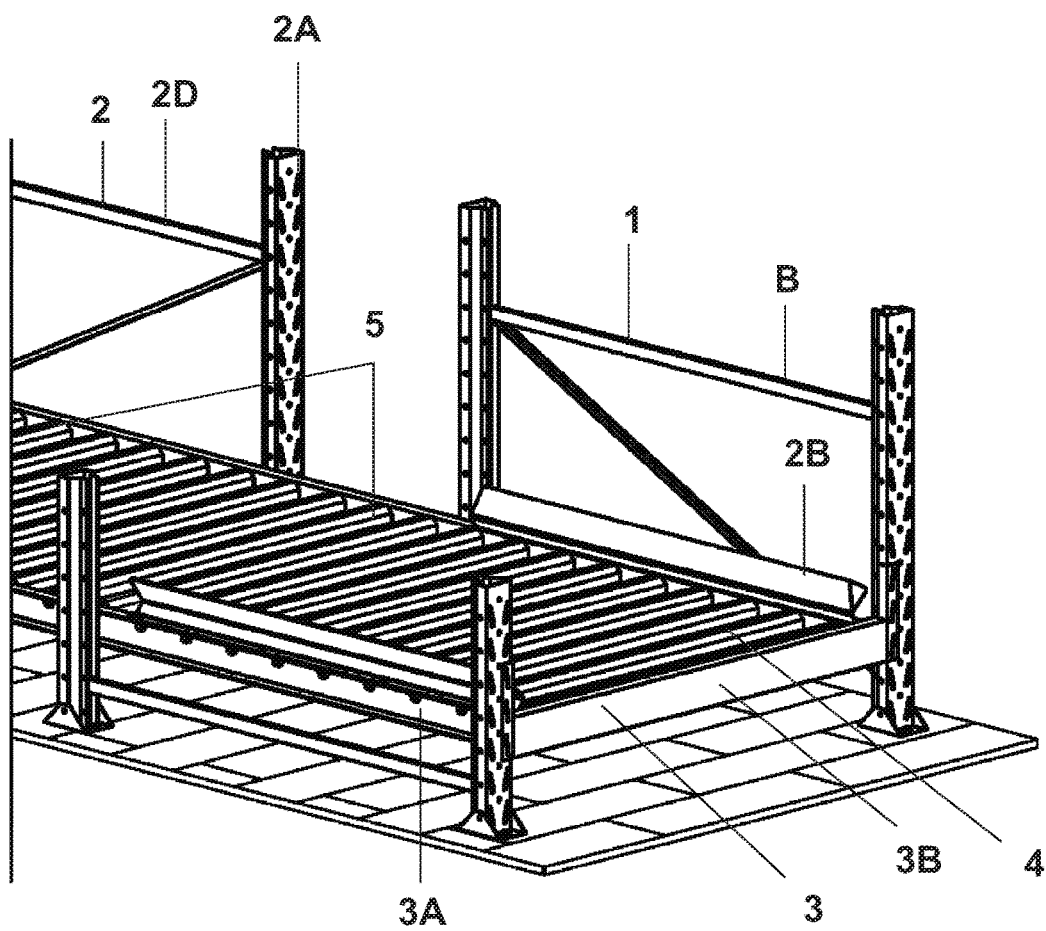
FIG. 3C is a perspective view in detail of the conveyor track of the horizontal motorized dynamic system for pallet-carrier racks.
Figure 3D:
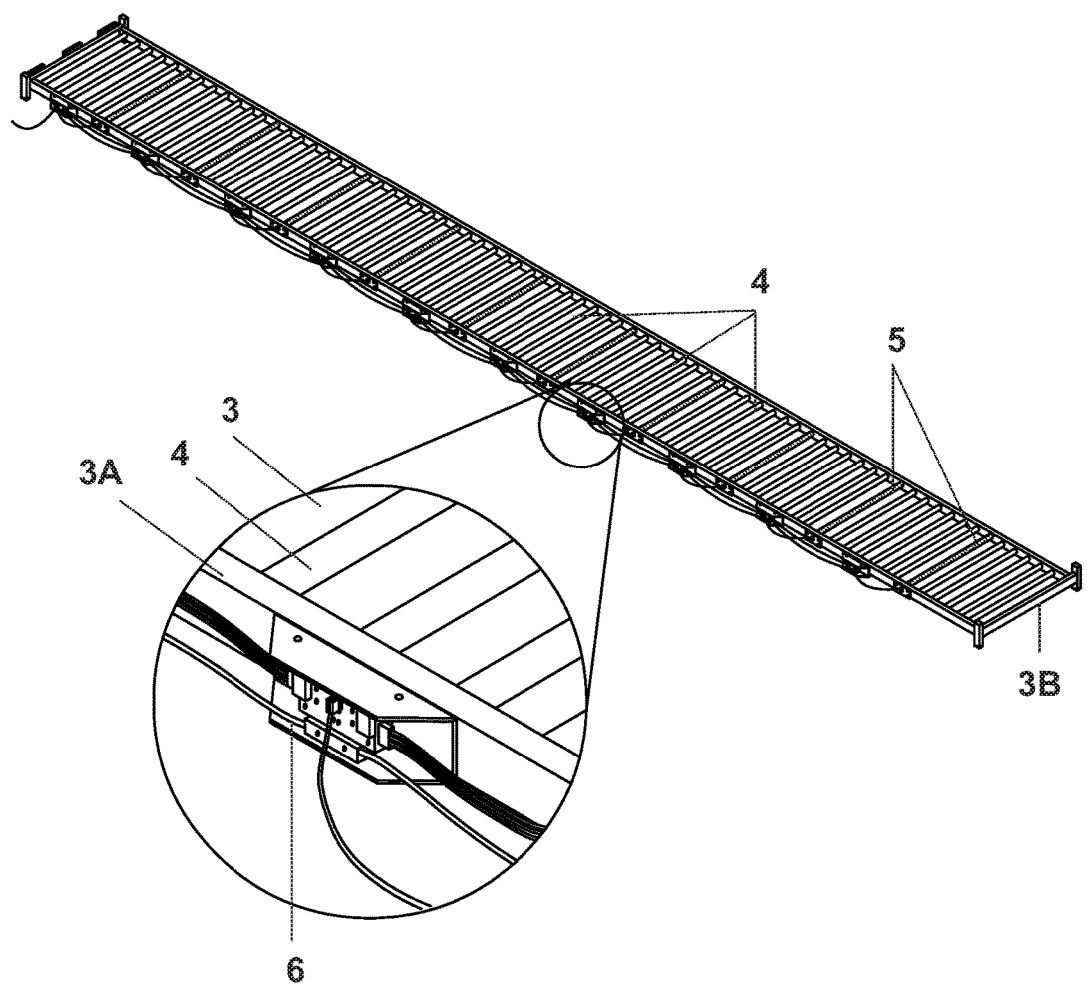
FIG. 3D is a top perspective view of the conveyor track of the horizontal motorized dynamic system for pallet-carrier racks showing the electronic board in detail.
Figure 3E:
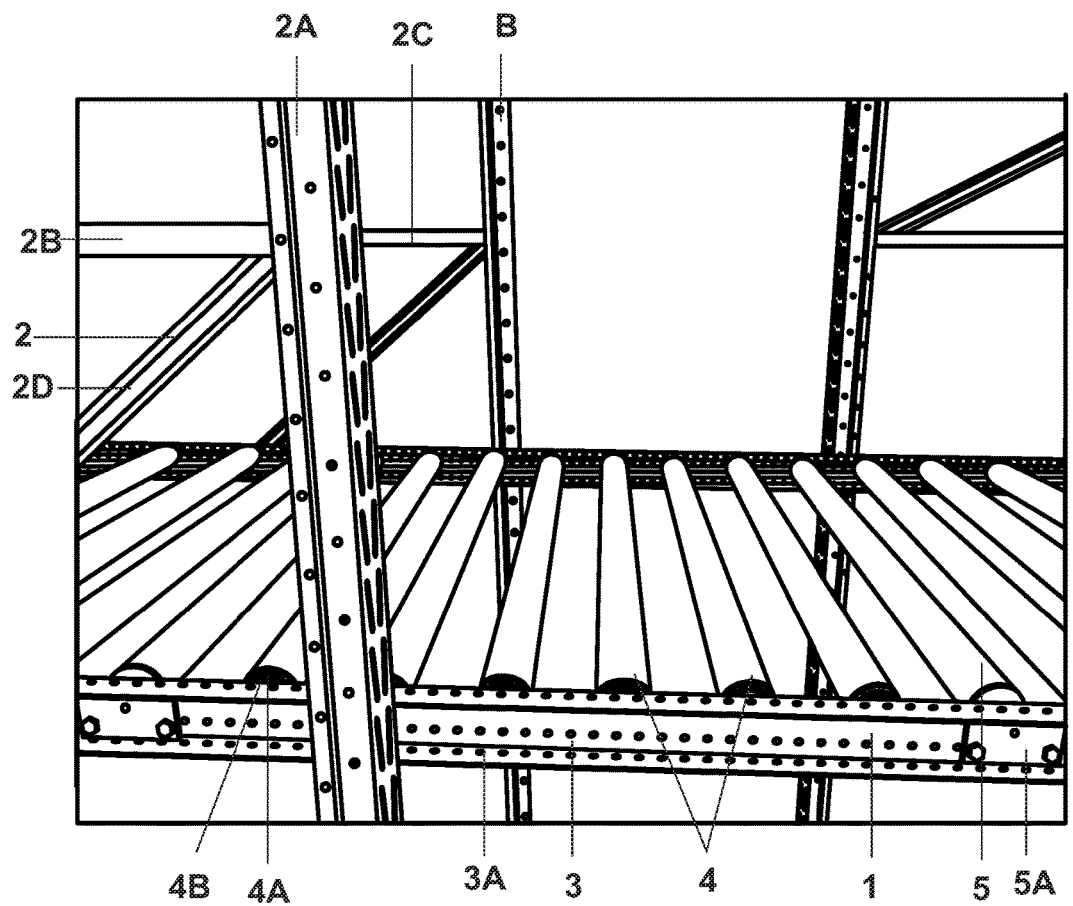
FIG. 3E is a top-side perspective view in detail of the conveyor track of the horizontal motorized dynamic system for pallet-carrier racks showing the motorized pulleys or motorized conveyor rollers and the conveyor rollers.
Figure 3F:
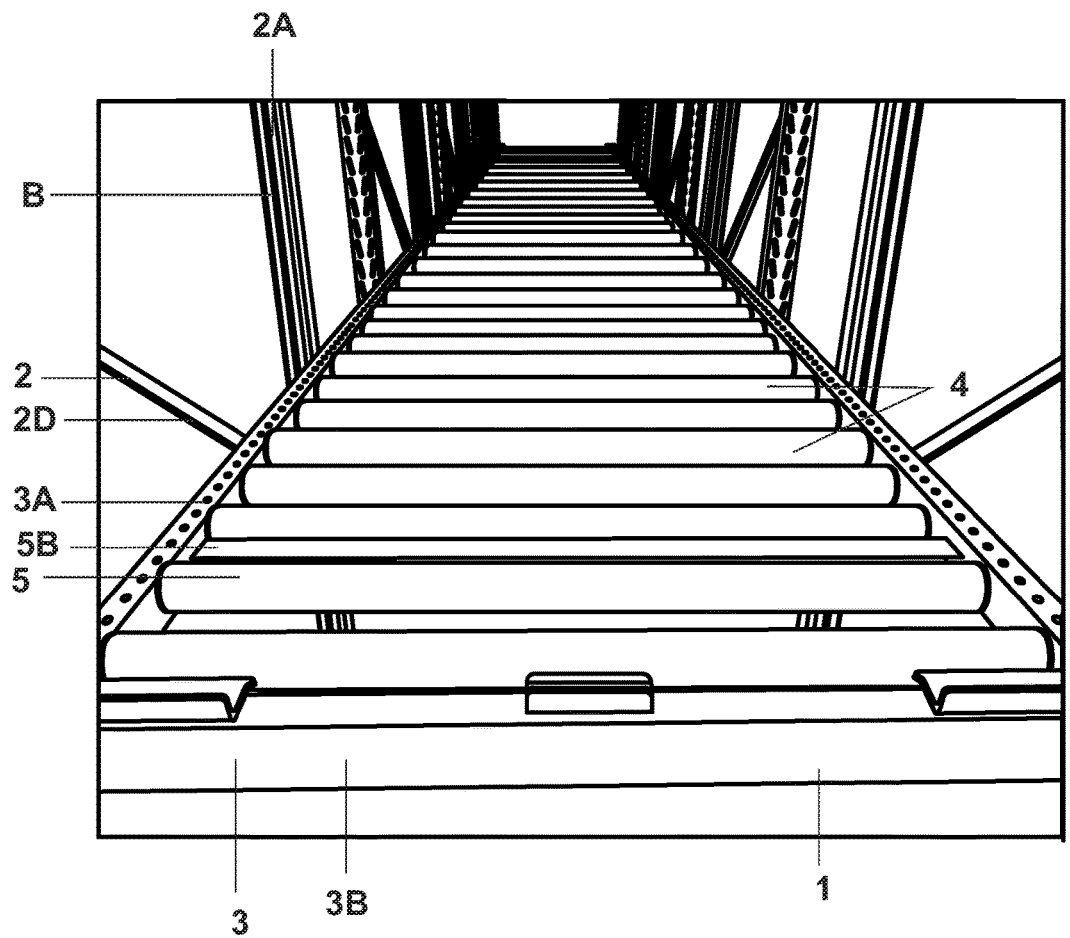
FIG. 3F is a front perspective view of the conveyor track of the horizontal motorized dynamic system for pallet-carrier racks showing the motorized pulleys or motorized conveyor rollers and the conveyor rollers.
Figure 3G:
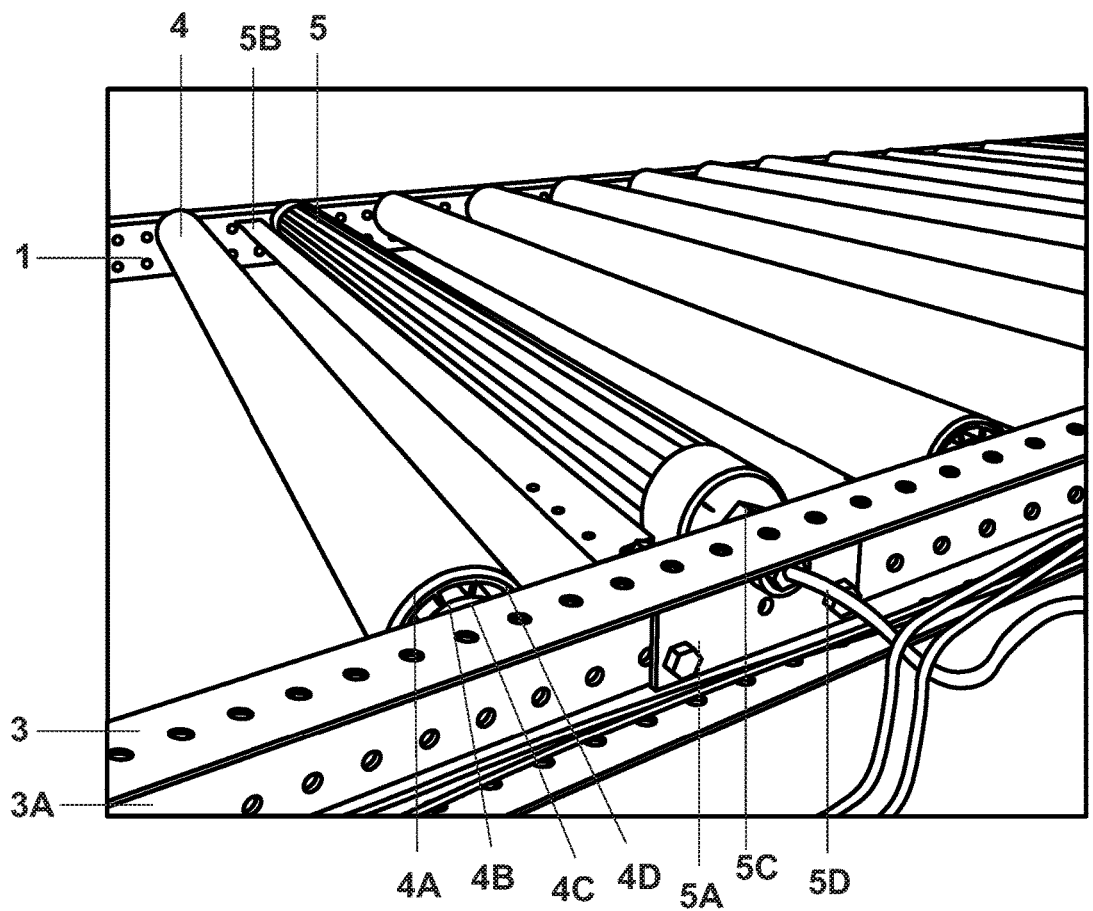
FIG. 3G is a top-side perspective view in detail of the conveyor track of the horizontal motorized dynamic system for pallet-carrier racks showing a motorized pulley or motorized conveyor roller and the conveyor rollers.
Figure 3H:
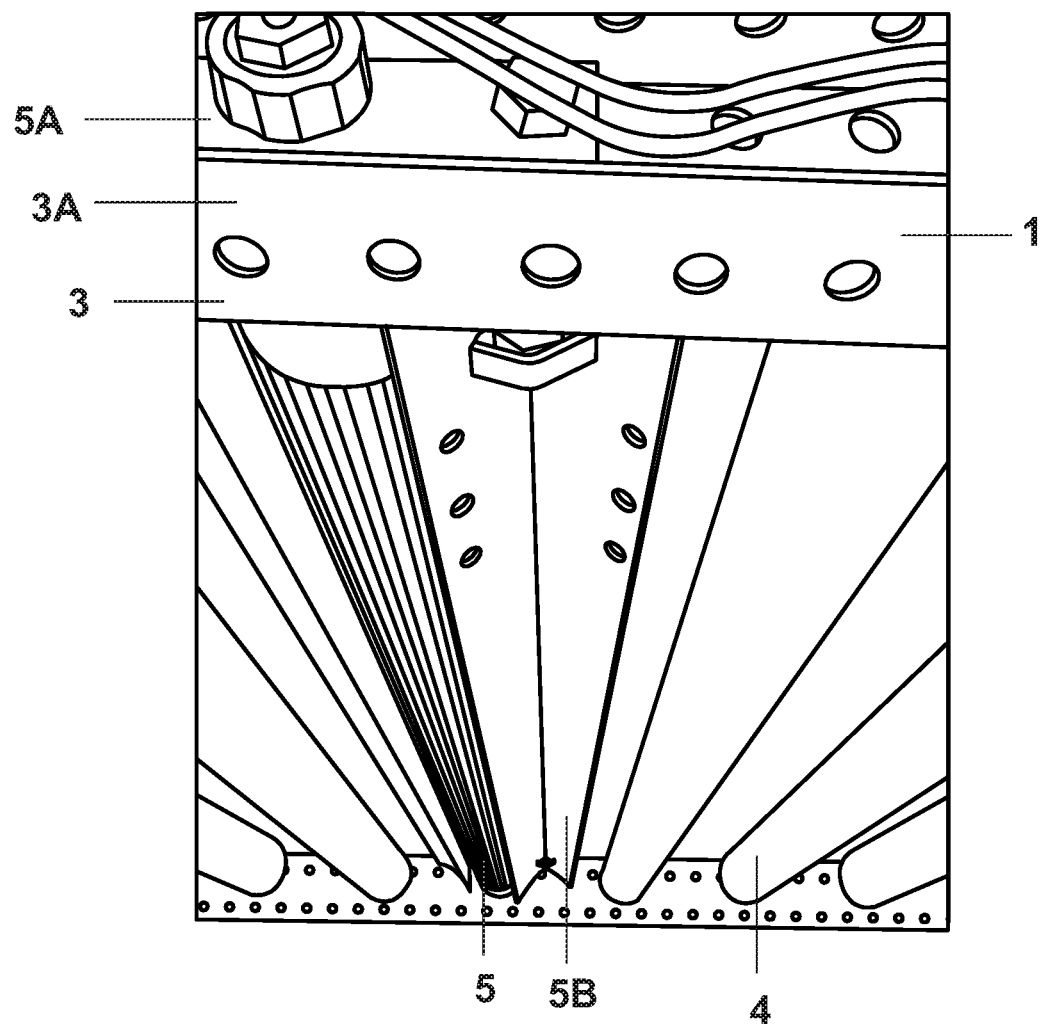
FIG. 3H is a lower-side perspective view in detail of the conveyor track of the horizontal motorized dynamic system for pallet-carrier racks showing a motorized pulley or motorized conveyor roller and the conveyor rollers.
Figure 3I:
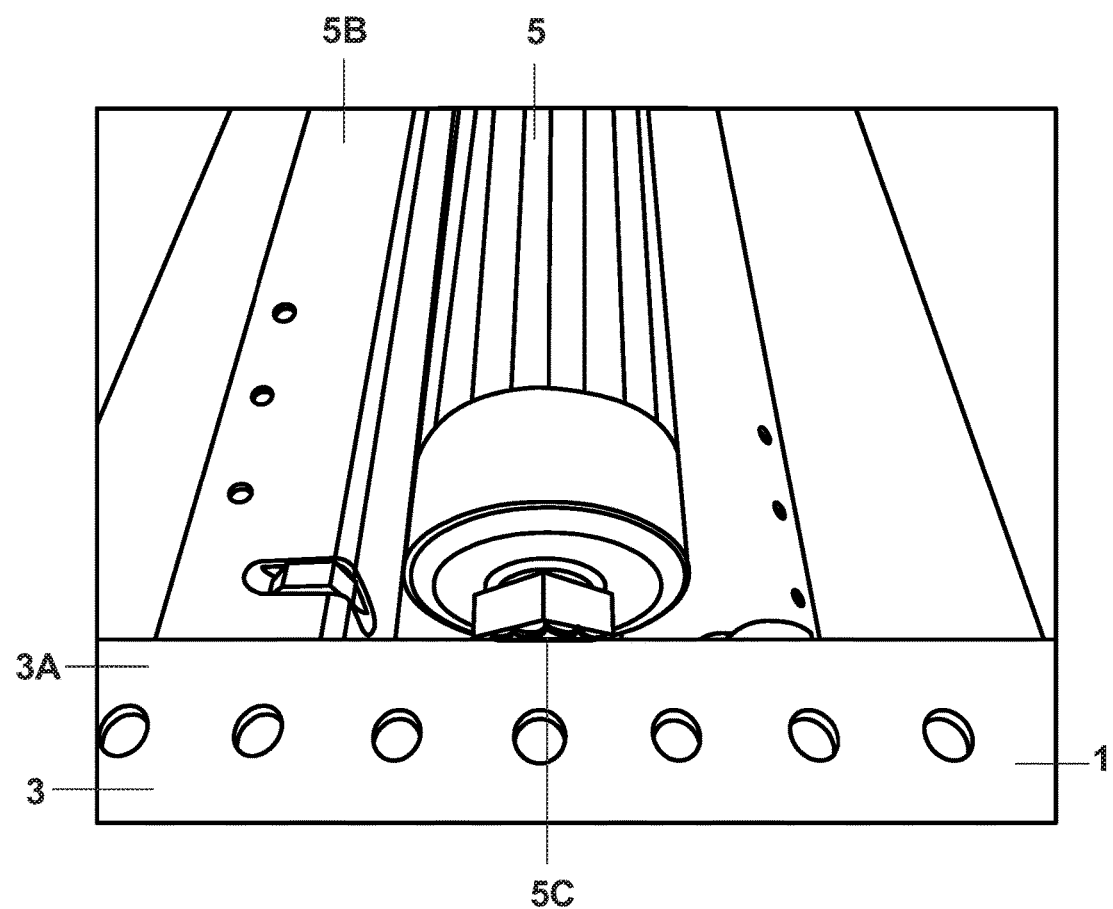
FIG. 3I is a top-side perspective view in detail of the conveyor track of the horizontal motorized dynamic system for pallet-carrier racks showing a motorized pulley or motorized conveyor roller fastened to the conveyor track frame rail.
Figure 4A:
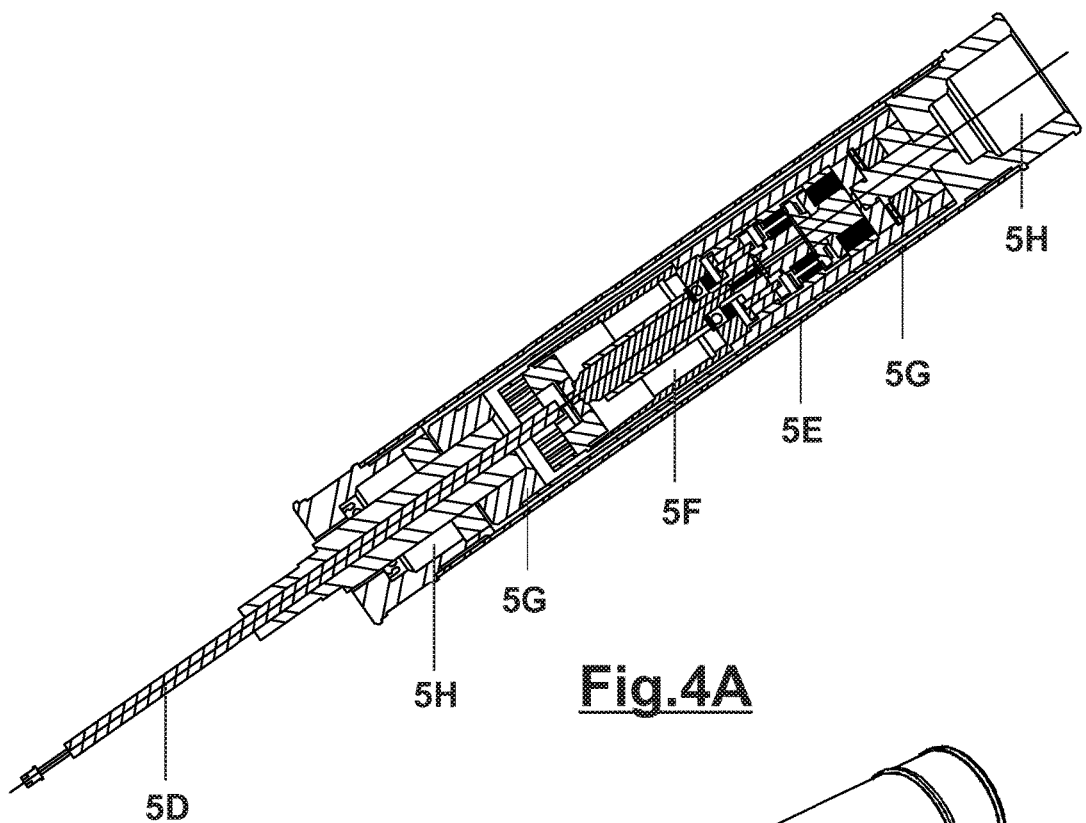
FIG. 4A is a perspective view of the moto reducer of the motorized pulley or motorized conveyor roller of the horizontal motorized dynamic system for pallet-carrier racks.
Figure 4B:
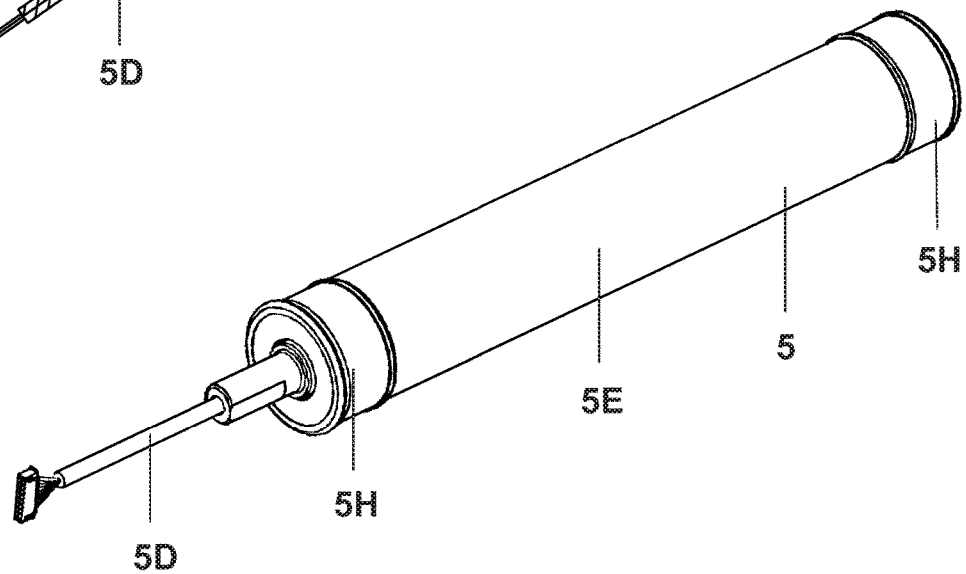
FIG. 4B is a cross-section side view of the moto reducer of the motorized pulley or motorized conveyor roller of the horizontal motorized dynamic system for pallet-carrier racks.

As shown from the accompanying drawings that illustrate and integrate the present descriptive report of the patent of invention "Horizontal Motorized Dynamic System for Pallet-Carrier Racks", FIG. 1A) shows the horizontal motorized dynamic system for pallet-carrier racks in general comprising a motorized dynamic system (1), complete and with specific characteristics, incorporating its own specific mechanical type structure of high durability and strength, general parallelepipedal shape, internal and external shapes and arrangements that adapt to various types of pallets (A), and containing a properly integrated and symmetrically arranged central structure (2) of general parallelepipedal shape vertically and symmetrically arranged along the entire length of the selective pallet-carrier rack (B) and containing side rails (2A), plates (2B), beams (2C) and bars (2D) comprising a support and levelling structure for the conveyor tracks (3); conveyor tracks (3) of general parallelepipedal shapes horizontally, parallel and symmetrically spaced apart vertically from each other along the entire length of the central structure (2) and each containing frame rails (3A) and beams (3B) comprising properly flat and horizontal pallet racking lines (A); conveyor rollers (4) of general cylindrical shapes horizontally, parallel and symmetrically spaced apart and lying crosswise along the entire length of the conveyor track (3) and each containing a pair of side panels (4A), a pair of side bearings (4B), a pair of side axles (4C) and a pair of side clamps (4D), forming properly flat and horizontal support and movement surfaces for the pallets (A); motorized pulleys or motorized conveyor rollers (5) of general cylindrical shapes horizontally, parallel and symmetrically spaced apart and lying crosswise along the entire length of the conveyor track (3), alternating sets of conveyor rollers (4) horizontally, parallel and symmetrically spaced apart along the entire length of the conveyor track (3), which comprise properly flat and horizontal traction, support and movement surfaces for the pallets (A); and electronic boards (6) of general parallelepipedal shapes vertically, parallel and symmetrically spaced apart along the entire frame rails (3A) of the conveyor tracks (3) and interconnected with two consecutive conveyor rollers (4), the electronic boards (6) adjacent to an electric power supply, one electronic board (6) for the control of the motorized dynamic system (1) and the other electronic boards (6) for the control of the pairs of motorized pulleys or motorized conveyor rollers (5), comprising the control units for the conveyor rollers (4).

Each motorized pulley or motorized conveyor roller (5) is made up by two plates (5A) of general rectilinear shapes formed with a C-shaped cross-sectional area and vertically, parallel and symmetrically arranged on the outer side faces of the frame rails (3A) adjacent to the side edges of a motorized pulley or motorized conveyor roller (5); two bars (5B) of general rectilinear shapes formed with a L-shaped cross-sectional area and horizontally, parallel and symmetrically spaced apart along the entire length of the front and rear faces of the motorized pulley or motorized conveyor roller (5) and perpendicular to the two plates (5A); and a set of gears (5C) of general circular shapes vertically and symmetrically centered between the two side edges of the motorized pulley or motorized conveyor roller (5), the plates (5A) and the frame rails (3A), cable (5D) interconnecting the motorized pulley or motorized conveyor roller (5) directly to the electronic board (6) pierces the plate (5A) and the frame rail (3A).

It should be noted that each motorized pulley or motorized conveyor roller (5), according to FIGS. (4A) and (4B), is formed by a tube (5E) with a general hollow cylindrical shape horizontally and symmetrically arranged along the entire length of the motorized pulley or motorized conveyor roller (5); a moto reducer (5F) with a general cylindrical shape horizontally and symmetrically arranged along the inside of tube (5C); two expandable and adherent couplings (5G) of general cylindrical shapes vertically, parallel and symmetrically arranged on the side ends of the moto reducer (5D) to snap fasten the moto reducer (5F) to the inside of the motorized pulley or motorized conveyor roller (5); and two bearings (5H) of general cylindrical shapes vertically and symmetrically arranged on the side ends of the tube (5E) to fasten the motorized pulley or motorized conveyor roller (5) to the conveyor track (3) frame rails (3A).

The application of the horizontal motorized dynamic system for pallet-carrier racks is based on the proper arrangement of the conveyor tracks (3) horizontally, parallel and symmetrically along the entire length of the selective pallet-carrier rack (B). At first, the main electronic board (6) is driven and, as a consequence, all the other interconnected electronic boards (6) are driven so that the motorized pulleys or motorized conveyor rollers (5) are driven by a pulse—to rotate constantly from time to time counterclockwise by the programming on the electronic board (6). Then, by using a forklift, a pallet (A) is vertically, parallel and symmetrically placed at the entry end of the conveyor track (3) so that it is positioned over the first motorized pulley or motorized conveyor roller (5). At this point, this motorized pulley or motorized conveyor roller (5) detects the presence of a pallet (A) on its body via an increase of amperage, a higher power surge, and reports to the electronic board (6) which, in turn, drives the motorized pulley or motorized conveyor roller (5) causing it to turn clockwise the number of times required and thus the pallet (A) starts sliding smoothly over the traditional conveyor rollers (4)—non motorized, up to the next motorized pulley or motorized conveyor roller (5) and so on until the pallet (A) exit position at the conveyor track (3), or up to its stop position—racking position. After the pallet (A) moves across one motorized pulley or motorized conveyor roller (5), the electronic board (6) checks that the pallet (A) is over the next motorized pulley or motorized conveyor roller (5); if that is the case, the electronic board (6) stops the previous motorized pulley or motorized conveyor roller (5) drive which, in turn, stops spinning. Thus, pallets (A) can move across the selective pallet-carrier racks (B) in a fully horizontal manner—without any kind of leaps and bumps between the stored pallets (A).

As the horizontal motorized dynamic system for pallet-carrier racks has fully integrated components, it can be assembled and disassembled quickly, nothing comes loose or breaks off or gets warped, and a high performance and efficiency level is achieved, combined with high durability and complete safety during use. Once fully integrated, the components are completely locked and united, thus preventing them from loosening when in use, keeping the assembly fully available for dynamic pallet racking (A) usually through level racking. The motorized dynamic system (1) can be thus used without concerns of any nature, especially regarding the safety and durability of its components and pallets (A).

This set of seemingly simple, but combined solutions arranged in the horizontal motorized dynamic system for pallet-carrier racks provide fully innovative and very useful features for this particular product category, which translates directly into great time saving, low-cost production feasibility, higher quality and safety, high stability and strength of the assembly, high handling capacity of the sets of pallets (A), powered dynamic structure, excellent productivity in the assembly stages, proper pallet (A) integrity, and extraordinary structural performance of the assembly as a whole.

The horizontal motorized dynamic system for pallet-carrier racks features as specific advantages: no need for any slope on the conveyor track (3) arrangement in the selective pallet-carrier rack (B), which generates greater safety and prevents load from being trapped, thus avoiding waste of space as one or more racking levels can be easily lost due to the decline in proportion to the depth of the tunnel; motorized pulleys or motorized conveyor rollers (5) are power-driven, which generates greater reliability and accuracy in the handling and arrival of pallets (A) at the exit end of the conveyor track (3); installations can be built with much greater depths, seemingly limitless, or limited to the user's physical space; no need for any kind of detection sensors such as those for positioning, entry and exit of pallets (A), thus avoiding lack of accuracy while driving rollers since pallet (A) detection is direct and individualized on each one of the motorized pulleys or motorized conveyor rollers (5); no need for any kind of traction system between the rollers such as belts and roller beds thus avoiding unnecessary wear between the components and lack of accuracy while driving rollers as they have fully independent driving and movement.

In view of the foregoing, the horizontal motorized dynamic system is a logistics system that will be well received by companies operating in logistics in general, mainly those using selective pallet-carrier racks (B) in general, since the horizontal motorized dynamic system for pallet-carrier racks has many advantages, such as: great safety, reliability and flexibility in its application; great efficiency and performance due to its general conception; great comfort, convenience and safety for the users; great overall strength and durability, combined with low or no wear of the assembly as a whole; fully accessible costs which provides an optimum cost/benefit ratio; practical and safe use in any type of pallet (A); proper and direct adaptation to several types of locations in general; high range; low and practical general maintenance; high operating accuracy; fully compatible weight and overall dimensions; higher load capacity of the assembly as a whole; excellent handling in picking and application stages; and the certainty of having a logistics system that fully meets the current rules and regulations, as well as the basic conditions required to its application with safety, performance and ergonomics.

All such attributes classify the horizontal motorized dynamic system for pallet-carrier racks as a fully versatile, efficient, practical and safe way for dynamic racking procedures of the most different types of pallets (A) over a wide range of pallet-carrier racks (B) in general, in various types of locations and by various experts in logistics, regardless of the general characteristics these might have, being also easy to use and handle, combined with great performance and excellent general characteristics; nevertheless, the sizes, dimensions and quantities may vary according to the needs of each application.

The invention claimed is:

1. A horizontal motorized dynamic system of pallet-carrier racks for dynamic pallet level racking, comprising:
  a selective pallet carrier rack, comprising:
    an integrated central parallelepipedally-shaped central structure, vertically and symmetrically arranged along an entire length of the selective pallet-carrier rack and adaptable to a variety of pallet types; the central structure having a multiplicity of symmetrically arranged side rails, side plates, side beams and side bars;
    a multiplicity of parallelepipedally-shaped conveyor tracks, horizontally, parallel and symmetrically spaced apart vertically along an entire length of the central structure, each conveyor track having a pair of frame rails and a pair of beams, the frame rails and beams forming flat horizontal pallet racking lines, wherein the central structure providing support and a levelling structure for the conveyor tracks;
    a multiplicity of cylindrically-shaped traditional conveyor rollers horizontally, parallel and symmetrically spaced apart and lying crosswise along an entire length of the conveyor tracks, each traditional conveyor roller having a pair of side panels, a pair of side bearings, a pair of side axles and a pair of side clamps, combining and forming flat horizontal surfaces allowing support and of a pallet;
    a multiplicity of cylindrically-shaped motorized conveyor rollers horizontally, parallel and symmetrically spaced apart and lying crosswise along the entire length of the conveyor tracks, each motorized conveyor roller alternating with multiple traditional conveyor rollers horizontally, parallel and symmetrically spaced apart along the entire length of the conveyor tracks, forming flat horizontal surfaces for traction, support and movement of the pallet; and
    a multiplicity of parallelepipedally-shaped electronic boards vertically, parallel and symmetrically spaced apart along the frame rails of the conveyor tracks, interconnected with two consecutive traditional conveyor rollers, the electronic boards positioned adjacent to an electric power supply, having a main electronic board controlling the motorized dynamic system, and the other electronic boards interconnected and controlling pairs of motorized conveyor rollers, and comprising control units for the traditional conveyor rollers, wherein the main electronic board is programmed and driven, and subsequently all other interconnected electronic boards are driven, by a pulse, in a manner to rotate the motorized conveyor rollers counterclockwise,
  wherein the motorized conveyor roller detects a presence of the pallet atop the motorized conveyor roller via an increase of amperage and a higher power surge, the motorized conveyor roller subsequently reporting to the electronic board and driving the motorized conveyor roller to turn clockwise, allowing the pallet to slide horizontally over the traditional conveyor rollers towards the next subsequent motorized conveyor roller, moving the pallet until the pallet a desired exit position or racking position is reached, and
  wherein each motorized conveyor roller integrates with the central structure via:
    a pair of rectilinear-shaped plates, each plate having a C-shaped cross-sectional area and vertically, parallel and symmetrically arranged on an outer side face of the frame rails adjacent to a side edge of one motorized conveyor roller;
    a pair of rectilinear-shaped bars, each bar having an L-shaped cross-sectional area and horizontally, parallel and symmetrically spaced apart along an entire length of a front and a rear face of one motorized conveyor roller, the bars also positioned perpendicular to the pair of plates;

a set of circular-shaped gears vertically and symmetrically centered between the side edges of the motorized conveyor rollers, the plates and the frame rails; and a cable connecting each motorized conveyor roller directly to the electronic board, the cable piercing the plate and the frame rail.

2. A horizontal motorized dynamic system of pallet-carrier racks for dynamic pallet level racking, comprising:

a selective pallet carrier rack, comprising:

an integrated central parallelepipedally-shaped central structure, vertically and symmetrically arranged along an entire length of the selective pallet-carrier rack and adaptable to a variety of pallet types; the central structure having a multiplicity of symmetrically arranged side rails, side plates, side beams and side bars;

a multiplicity of parallelepipedally-shaped conveyor tracks, horizontally, parallel and symmetrically spaced apart vertically along an entire length of the central structure, each conveyor track having a pair of frame rails and a pair of beams, the frame rails and beams forming flat horizontal pallet racking lines, wherein the central structure providing support and a levelling structure for the conveyor tracks;

a multiplicity of cylindrically-shaped traditional conveyor rollers horizontally, parallel and symmetrically spaced apart and lying crosswise along an entire length of the conveyor tracks, each traditional conveyor roller having a pair of side panels, a pair of side bearings, a pair of side axles and a pair of side clamps, combining and forming flat horizontal surfaces allowing support and of a pallet;

a multiplicity of cylindrically-shaped motorized conveyor rollers, horizontally, parallel and symmetrically spaced apart and lying crosswise along the entire length of the conveyor tracks, each motorized conveyor roller alternating with multiple traditional conveyor rollers horizontally, parallel and symmetrically spaced apart along the entire length of the conveyor tracks, forming flat horizontal surfaces for traction, support and movement of the pallet; and a multiplicity of parallelepipedally-shaped electronic boards vertically, parallel and symmetrically spaced apart along the frame rails of the conveyor tracks, interconnected with two consecutive traditional conveyor rollers, the electronic boards positioned adjacent to an electric power supply, having a main electronic board controlling the motorized dynamic system, and the other electronic boards interconnected and controlling pairs of motorized conveyor rollers, and comprising control units for the traditional conveyor rollers, wherein the main electronic board is programmed and driven, and subsequently all other interconnected electronic boards are driven, by a pulse, in a manner to rotate the motorized conveyor rollers counterclockwise, wherein the motorized conveyor roller detects a presence of the pallet atop the motorized conveyor roller via an increase of amperage and a higher power surge, the motorized conveyor roller subsequently reporting to the electronic board and driving the motorized conveyor roller to turn clockwise, allowing the pallet to slide horizontally over the traditional conveyor rollers towards the next subsequent motorized conveyor roller, moving the pallet until the pallet a desired exit position or racking position is reached, and wherein each motorized conveyor roller comprising:

a cylindrically-shaped hollow tube, horizontally and symmetrically arranged along an entire length of the motorized conveyor roller;

a cylindrically-shaped moto reducer, horizontally and symmetrically arranged along an inside of the tube;

a pair of cylindrically-shaped expandable adherent couplings, vertically, parallel and symmetrically arranged on side ends of the moto reducer, allowing the moto reducer to snap fasten inside of the motorized conveyor roller; and a pair of cylindrically-shaped bearings vertically and symmetrically arranged on side ends of the tube, fastening the motorized conveyor roller to the conveyor track frame rails.

3. A horizontal motorized dynamic system of pallet-carrier racks for dynamic pallet level racking, comprising:

a selective pallet carrier rack, comprising:

an integrated central parallelepipedally-shaped central structure, vertically and symmetrically arranged along an entire length of the selective pallet-carrier rack and adaptable to a variety of pallet types; the central structure having a multiplicity of symmetrically arranged side rails, side plates, side beams and side bars;

a multiplicity of parallelepipedally-shaped conveyor tracks, horizontally, parallel and symmetrically spaced apart vertically along an entire length of the central structure, each conveyor track having a pair of frame rails and a pair of beams, the frame rails and beams forming flat horizontal pallet racking lines, wherein the central structure providing support and a levelling structure for the conveyor tracks;

a multiplicity of cylindrically-shaped traditional conveyor rollers horizontally, parallel and symmetrically spaced apart and lying crosswise along an entire length of the conveyor tracks, each traditional conveyor roller having a pair of side panels, a pair of side bearings, a pair of side axles and a pair of side clamps, combining and forming flat horizontal surfaces allowing support and of a pallet;

a multiplicity of cylindrically-shaped motorized pulleys, horizontally, parallel and symmetrically spaced apart and lying crosswise along the entire length of the conveyor tracks, each motorized pulley alternating with multiple traditional conveyor rollers horizontally, parallel and symmetrically spaced apart along the entire length of the conveyor tracks, forming flat horizontal surfaces for traction, support and movement of the pallet; and a multiplicity of parallelepipedally-shaped electronic boards vertically, parallel and symmetrically spaced apart along the frame rails of the conveyor tracks, interconnected with two consecutive traditional conveyor rollers, the electronic boards positioned adjacent to an electric power supply, having a main electronic board controlling the motorized dynamic system, and the other electronic boards interconnected and controlling pairs of motorized pulleys, and comprising control units for the traditional conveyor rollers, wherein the main electronic board is programmed and driven, and subsequently all other interconnected electronic boards are driven, by a pulse, in a manner to rotate the motorized pulleys counterclockwise, wherein the motorized pulley detects a presence of the pallet atop the motorized pulley via an increase of amperage and a higher power surge, the motorized pulley subsequently reporting to the electronic board and driving the motorized pulley to turn clockwise, allowing the pallet to slide horizontally over the traditional conveyor rollers towards the next subsequent motorized pulley, moving the pallet until the pallet a desired exit position or racking position is reached.

4. The system of claim 3, wherein each motorized pulley integrates with the central structure via:

a pair of rectilinear-shaped plates, each plate having a C-shaped cross-sectional area and vertically, parallel and symmetrically arranged on an outer side face of the frame rails adjacent to a side edge of one motorized pulley;

a pair of rectilinear-shaped bars, each bar having an L-shaped cross-sectional area and horizontally, parallel and symmetrically spaced apart along an entire length of a front and a rear face of one motorized pulley, the bars also positioned perpendicular to the pair of plates;

a set of circular-shaped gears vertically and symmetrically centered between the side edges of the motorized pulleys, the plates and the frame rails; and a cable connecting each motorized pulley directly to the electronic board, the cable piercing the plate and the frame rail.

5. The system of claim 3, wherein each motorized pulley comprising:

a cylindrically-shaped hollow tube, horizontally and symmetrically arranged along an entire length of the motorized pulley;

a cylindrically-shaped moto reducer, horizontally and symmetrically arranged along an inside of the tube;

a pair of cylindrically-shaped expandable adherent couplings, vertically, parallel and symmetrically arranged on side ends of the moto reducer, allowing the moto reducer to snap fasten inside of the motorized pulley; and a pair of cylindrically-shaped bearings vertically and symmetrically arranged on side ends of the tube, fastening the motorized pulley to the conveyor track frame rails.

\* \* \* \* \*